United States Patent [19]
Bleier et al.

[11] Patent Number: 5,369,259
[45] Date of Patent: Nov. 29, 1994

[54] CHIP CARD READER

[75] Inventors: Robert Bleier, Untergruppenbach; Hans G. Hubner, Heilbronn, both of Germany

[73] Assignee: Amphenol Corporation, Wallingford, Conn.

[21] Appl. No.: 169,554

[22] Filed: Dec. 20, 1993

Related U.S. Application Data

[63] Continuation of Ser. No. 842,154, May 4, 1992, abandoned.

[30] Foreign Application Priority Data

Sep. 21, 1989 [DE] Germany .................. 3931508

[51] Int. Cl.⁵ ............................................. G06K 7/06
[52] U.S. Cl. ................................. 235/441; 235/482; 235/483
[58] Field of Search ................. 235/441, 482, 483

[56] References Cited

U.S. PATENT DOCUMENTS

| | | | |
|---|---|---|---|
| 3,917,372 | 11/1975 | Selinko | 339/75 M |
| 4,236,667 | 12/1980 | Crowley et al. | 235/443 |
| 4,288,140 | 9/1981 | Griffith et al. | 339/74 R |
| 4,575,703 | 3/1986 | Shishido | 235/479 |
| 4,717,817 | 1/1988 | Grassl et al. | 235/441 |
| 4,724,310 | 2/1988 | Shimamura et al. | 235/483 |
| 4,734,567 | 3/1988 | Hansbauer | 235/482 |
| 4,735,578 | 4/1988 | Reichardt et al. | 439/152 |
| 4,752,234 | 6/1988 | Reichardt et al. | 439/260 |
| 4,770,639 | 9/1988 | Lau | 439/61 |
| 4,795,897 | 1/1989 | Chalendard | 235/482 |
| 4,799,891 | 1/1989 | Reichardt et al. | 439/43 |
| 4,814,593 | 3/1989 | Reichardt et al. | 235/482 |
| 4,900,273 | 2/1990 | Pernet | 439/630 |
| 4,932,889 | 6/1990 | Bleier et al. | 439/260 |
| 4,975,086 | 12/1990 | Reichardt et al. | 439/629 |
| 4,976,630 | 12/1990 | Schuder et al. | 439/260 |

FOREIGN PATENT DOCUMENTS

| | | |
|---|---|---|
| 0139593 | 5/1985 | European Pat. Off. . |
| 0186737 | 7/1986 | European Pat. Off. . |
| 0214478 | 3/1987 | European Pat. Off. . |
| 0254316 | 1/1988 | European Pat. Off. . |
| 0274534 | 7/1988 | European Pat. Off. . |
| 0316699 | 5/1989 | European Pat. Off. . |
| 0333530 | 9/1989 | European Pat. Off. . |
| 0351103 | 1/1990 | European Pat. Off. . |
| 2489558 | 3/1982 | France . |
| 2607287 | 5/1988 | France . |
| 2633750 | 1/1990 | France . |
| 2952442A1 | 7/1980 | Germany . |
| 3343727A1 | 6/1985 | Germany . |
| 3343757A1 | 6/1985 | Germany . |
| 3402632A1 | 8/1985 | Germany . |
| 3443561A1 | 5/1986 | Germany . |
| 3531318A1 | 3/1987 | Germany . |
| 3602668A1 | 7/1987 | Germany . |
| 3625306A1 | 1/1988 | Germany . |
| 3442397A1 | 5/1988 | Germany . |
| 3808183 | 9/1988 | Germany . |
| 3810275A1 | 10/1989 | Germany . |
| 3832588A1 | 3/1990 | Germany . |
| 3931506A1 | 4/1991 | Germany . |

Primary Examiner—Harold Pitts
Attorney, Agent, or Firm—Bacon & Thomas

[57] ABSTRACT

A chip card reader comprises a contact support and a card receiver. The card receiver can be moved back and forth in the contact support so that, when a chip card is inserted in the card receiver, the card receiver is moved (lowered), together with the card, toward the contacts in the contact support.

15 Claims, 6 Drawing Sheets

CHIP CARD READER

This application is a continuation of application Ser. No. 07/842,154, filed May 4, 1992, now abandoned.

BACKGROUND OF THE INVENTION

The present invention relates to a chip card reader, into which the chip card can be inserted and removed in longitudinal direction, i. e. by means of a so called "push-pull" operation. The contact elements present within the chip card reader are specifically designed as contact springs, such that they are only placed on the contact zones of the chip cards during operation, so that they will not slide across the plastic material of which the chip card is made.

German Offenlegungsschrift DE-OS 3531318 discloses a chip card reader within which a chip card can be moved with respect to contact elements which are stationarily located within the housing of the chip card reader. However, said known chip card reader does not operate in accordance with the push-pull-principle. In fact, a locking means is used which provides a locking effect when the card is inserted. That locking means has to be released if it is intended to remove the card.

SUMMARY OF THE INVENTION

The present invention however, relates to a chip card reader of the push-pull-type and further to a chip card reader which, similarly to the cited prior art, uses contact elements which are stationarily located in the housing of the so called contact support of the chip card reader.

Just to make sure that contact elements, also called reading contact elements, will only carry out a slide movement within the standardized contact region of the chip card but not on the plastic material of the card surrounding the contact zones, or possibly on a grounded annular area, the downward movement of the chip card towards the reading contact elements is effected when pushing the card into the chip card reader. Similarly, for the opposite operation, when the card is pulled out of the chip card reader no touching of the surface of the plastic material occurs. It should be noted that the contacting operation of the contact zones on the chip card is necessary to read the information contained in the chip card.

More specifically, the present invention provides for a contact element support within which the reading contacts as well as switching contacts, yet to be explained, are stationarily mounted so that said contacts can be used as soldering contacts when soldering the contact support into a printed circuit board. However, said contact elements do not have to be soldering contacts. In accordance with the present invention, in said contact support a card receiving means is provided which is adapted to receive a chip card. Said card receiving means is reciprocally mounted in the direction of insertion of the chip card. Preferably, the card receiving means is not only mounted in the contact support for movement in the longitudual direction but also for an elevational movement. The card receiving means is provided with elements forming a card slot for the receipt and the guidance of the card.

The card receiving means is maintained in the receiving and ejecting position by means of a return spring. In said receiving and ejecting position the card receiving means can be moved into its reading position when the chip card is inserted. During this process of insertion the card receiving means is moved together with the card and moves for instance at an angle of 120° with respect to the contact element support, until the reading contacts come into engagement with the contact region and slide until the final abutment of the card is reached.

In accordance with the invention a card brake is also integrated into the contact support. Said card brake is adapted to hold the chip card together with the card receiving means in the reading position against the force exerted by the return spring. In accordance with the prefered embodiment of the invention the card brake is a metal clamp which is rotatably mounted at the card support means such, that the brake can follow the downward movement of the chip card. When the card is withdrawn, then the holding force of the return spring formed by the metal clamp has to be overcome. The card receiving means follows the movement of the chip card due to the existence of the return spring and thus returns into the insert and ejection position guided by the cam path provided for the downward movement.

In accordance with another embodiment of the invention the set of contacts formed by the contact elements does not comprise only reading contacts but also at least two switching contacts, as already mentioned. The switching contacts are actuated by a resilient switching arm formed together with the contact support. The resilient switching arm will be displaced by the chip card itself after the reading contacts have already closed.

In accordance with another embodiment of the invention the reading contacts and the switching contacts are biased. The bias for the contact springs has the effect, that for the small available spring movement or path the required contact force is exerted. Due to the flat spring charactaristic the tolerances in thickness of the card do not influence the force of the contact elements in an undue manner.

Prefered embodiments of the invention are disclosed specifically in the claims as well as the following discription of the embodiments.

BRIEF DESCRIPTION OF THE DRAWINGS

Additional advantages, objects and details of the invention may be gathered from the following discription of embodiments together with the drawings; in the drawings.

DETAILED DESCRIPTION OF THE PREFERRED EMBODIMENTS

Figure 1:
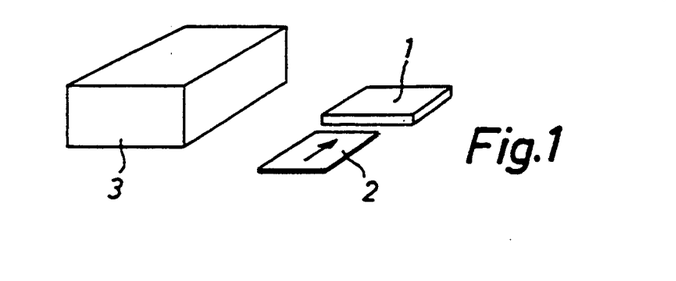
FIG. 1 is a schematic representation of a chip card reader in it is environment.

FIG. 1 discloses a chip card reader 1, into which a chip card 2 can be moved, so as to be able to read the data contained within the chip card 2 or to possibly change or supplement said data. The chip card reader 1 is customarily used together with an apparatus 3, for instance a telephone apparatus. For this purpose, the chip card reader 1 is frequently built into said apparatus 3, or components of said apparatus 3. The contact elements (short: contacts) present in the chip card reader 1, for contacting the contact zones of the chip card 2, are then frequently connected by a flat cable to respective components of the apparatus 3. Preferably, the present invention relates to a chip card reader having stationarily mounted contact elements. Said contact elements are preferably soldered into a printed circuit board in an apparatus 3, by means of termination ends.

Figure 2:
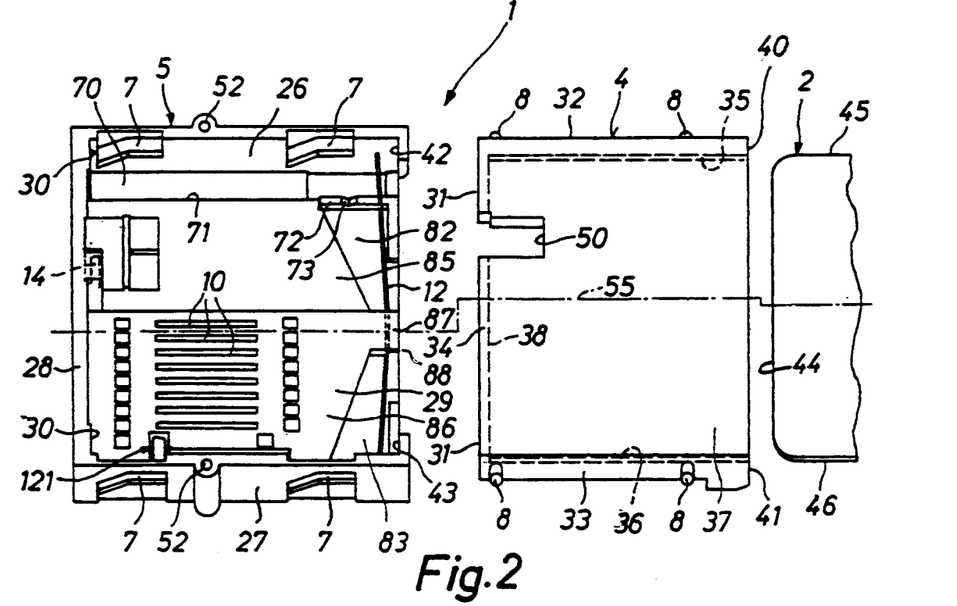
FIG. 2 is an isometric representation from a somewhat inclined upward position towards the two main components, (contact support and the card receiving means) of the chip card reader as well as of the card.
Figure 3:
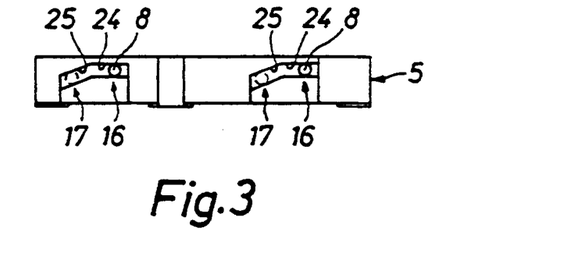
FIG. 3 is a side elevational view of the side of the contact support which is located at the forward side in FIG. 2
Figure 4:
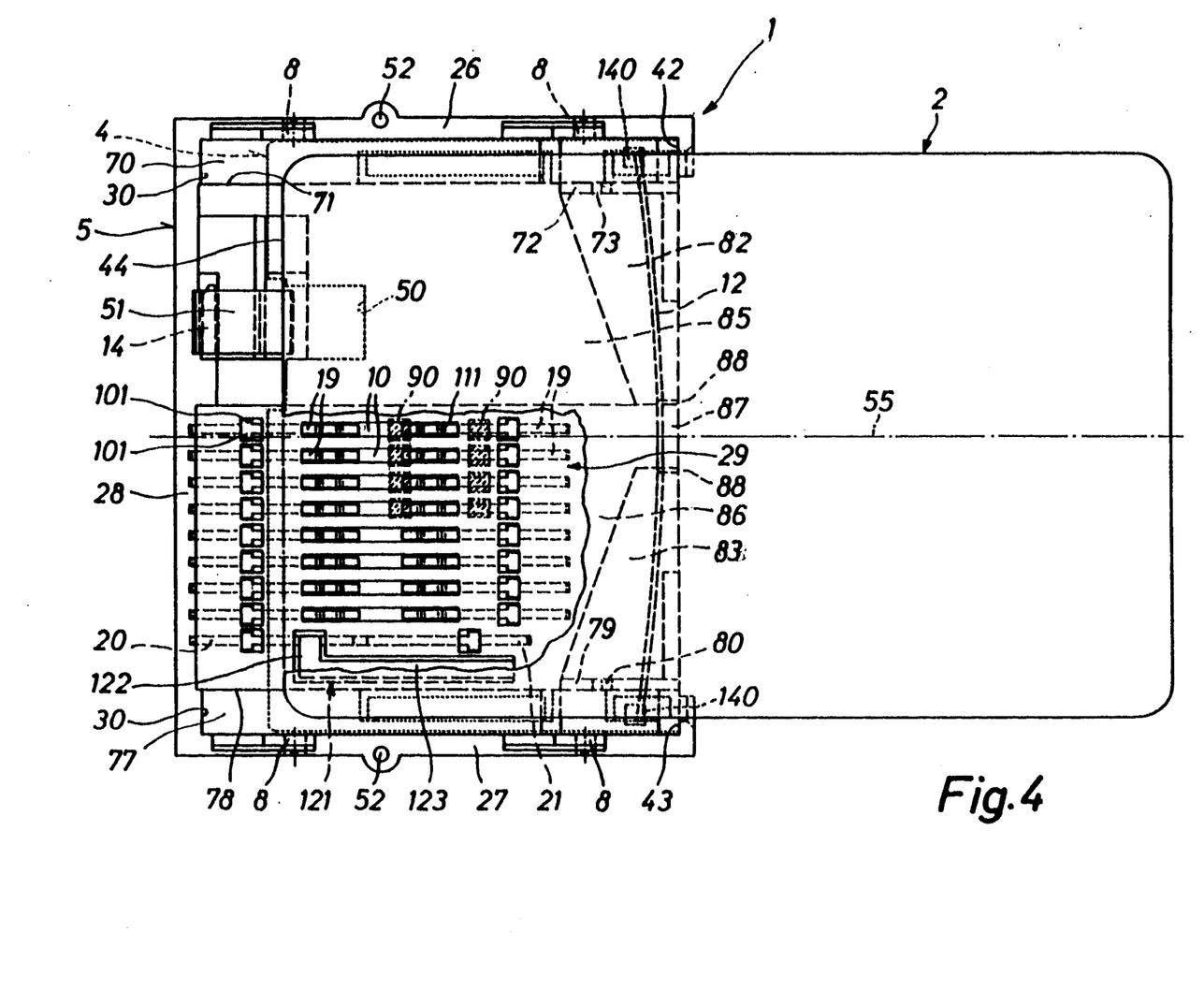
FIG. 4 is a plan view of the contact support with the card receiving means being shown in dashed lines.

FIGS. 2 and 3 disclose the general design of a chip card reader of the invention which comprises two main parts, i.e. a card receiving means 4 and a contact element support (contact support) 5. The contact receiving means 4 is, as shown in FIG. 4, reciprocally mounted or guided along the longitudinal axis 55 of the contact support 5 by means of support and guide means. The guide means are formed by guide means 7 in the form of slots 7 in the contact support and by guide means 8 in the form of pins 8 in the card receiving means. Due to the fact that the contact support 5 (as well as that card receiving means 4) are made of plastic material - see FIG. 2 - the upper pins 8 can snappingly move into the respective slots 7 after the lower pins 8 have been inserted in the respective slots 7.

Into the contact support 5 contact elements are inserted, preferably in the form of contact springs; the receiving slots adapted to receive the contact springs are referred to by reference number 10.

The reciprocal movement of the card receiving means occurs between a card receiving/ejecting position 16 (also referred to as a rest position) and a reading position 17. The rest position 16 and the reading position 17 are shown in FIG. 3 schematically by the position of the pins 8, with the rest position being shown in FIG. 5 and the reading position being shown in FIG. 8. A spring 12 is adapted to urge the card receiving means 4 into the rest position 16 if no card 2 is inserted.

In the slots 10 adapted to receive the contact springs, reading contact springs (reading contacts) 19 and switching contact springs (switchting contacts) 20 and 21 are located (as is shown in detail in FIG. 4). In the embodiment of FIG. 4 sixteen reading contacts 19 as well as two switching contacts, i.e. a first switching contact 20 and a second switching contact 21 are provided.

The contact support is formed by a bottom wall 29 from which a first side wall 26 and a second side wall 27 as well as a back wall 28, connecting walls 26 and 27, extend upwardly. The back wall 28 forms abutment surfaces 30 for the respective abutment surfaces 31 of the contact receiving means 4. Further, at the back wall 28 mounting means are provided in the form of a pin 14 for a card brake 51 yet to be described.

The guide means 7 on the contact support means comprise respectively, as shown in FIG. 3, a horizontal slot portion 24 and, adjacent thereto, an inclined slot portion (downward movement curve) 25. Attention is drawn already now to the fact that FIG. 3 discloses that the reading positions 17 is reached, while the pins 8 are stil in the area of the downward curve 25.

FIG. 2 discloses further, that angled arms project under a right angle with respect to the sidewalls 26 and 27. That arms from abutment surfaces 42 and 43, respectively, which come into abutment with respective abutment edges 40, 41 of the card receiving means 4 due to the force of the spring 12 when the card receiving means 4 is in its rest position.

Prior to describing the contact support 5 by reference to FIG. 4 a short reference should be made to FIG. 2 which shows that the card receiving means 4 is formed by a cover wall 37, with walls extending downwardly therefrom (FIG. 2); a first side wall 32, a second side wall 33 and a back wall 34. Short webs project inwardly parallel to the cover wall 37 forming a slot for the receipt of the card 2 so as to form guide paths 35 and 36 for the side edges 45, 46 of the card 2. The back wall 34 forms an abutment surface or an abutment edge 38 for the frontal or abutment edge 44 of the card 2. A cut out portion 50 in the cover wall 37 provides space for the card brake in the form of a brake spring 51.

Referring now to FIG. 4 the description of the contact support 5 will be completed. The contact support 5 carries on a pin 14 the card brake in the form of a brake spring 51. Mountings means 52 are used for mounting it to a component, for instance a printed circuit board of the apparatus 3. In the bottom wall 29 a first groove like recess (groove) is provided adjacent to the first side wall 26 in the bottom wall 29. Adjacent to the second side wall 27 a second groove 77 is provided. An edge 71 borders the first groove 17 and continues in a web 72 within which a V-shaped recess 73 (extending into the plan of the drawing) is formed. In symmetry thereto, the second groove 77 is limited by an edge 78 which continues a web 79 having a V-shaped recess 80. One surface 85 is on a higher elevation than the bottom of the groove 70, however lower with respect to the surface 85 a recess 82 is provided which is almost on the same level as another recess 83 which is lower with respect to a contact receiving surface 86. The contact receiving surface 86 is, in turn, higher than the surface 85. The contact receiving surface 76 forms a spring support in the form of a projection which allows due to two symmetrically located slots 88 the insertion of the spring 12. The spring 12 can slide from it position shown in FIG. 4 leftwardly when the card receiving means is in its reading position; said sliding occurs on the webs and reaches the recesses 73, 80 when the card receiving means 4 reaches the reading position. In its rest position, the spring 12 is preferably a straight spring wire.

Figure 7:
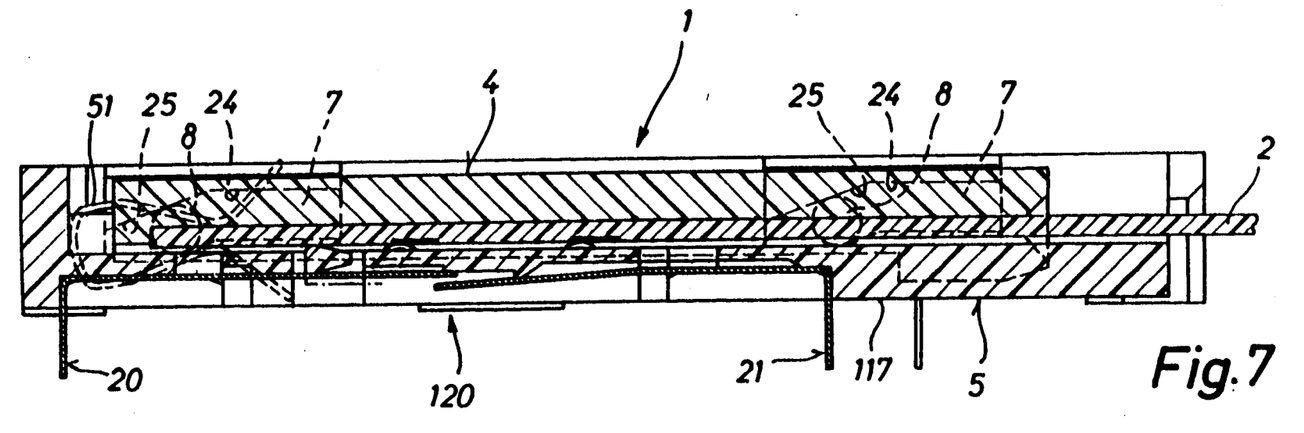
FIG. 7 is a view similar to FIG. 5 with the card receiving means having approached the reading position even more and with the contact zones of the chip card just being contacted by the reading contacts.
Figure 8:
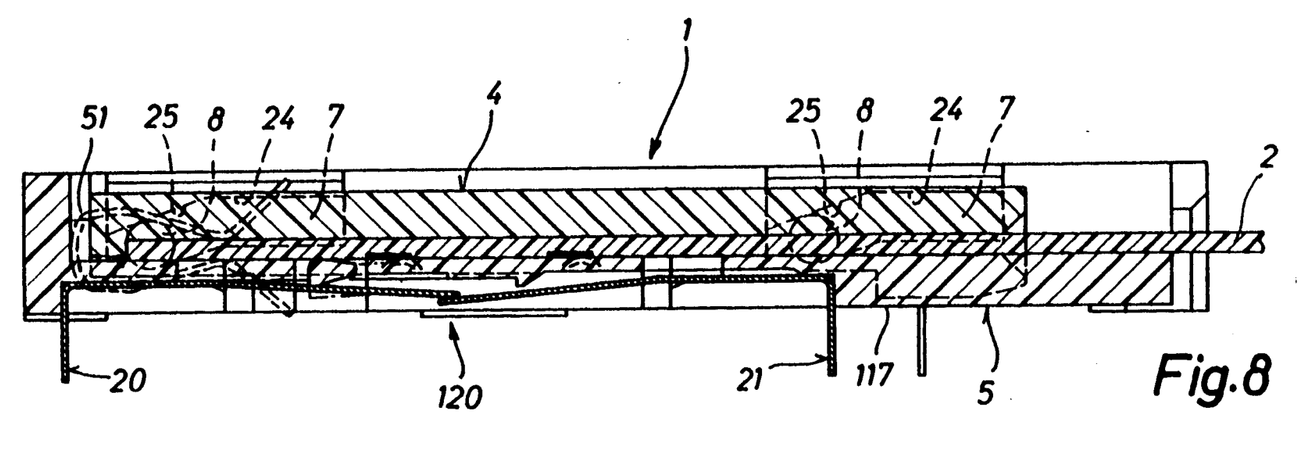
FIG. 8 is a view similar to FIG. 5 with the chip card receiving means being in its end or reading position, showing that the contact zones are still in engagement with the reading contacts and further showing that the two switching contacts are now closed.
Figures 9, 10, 11, 12:
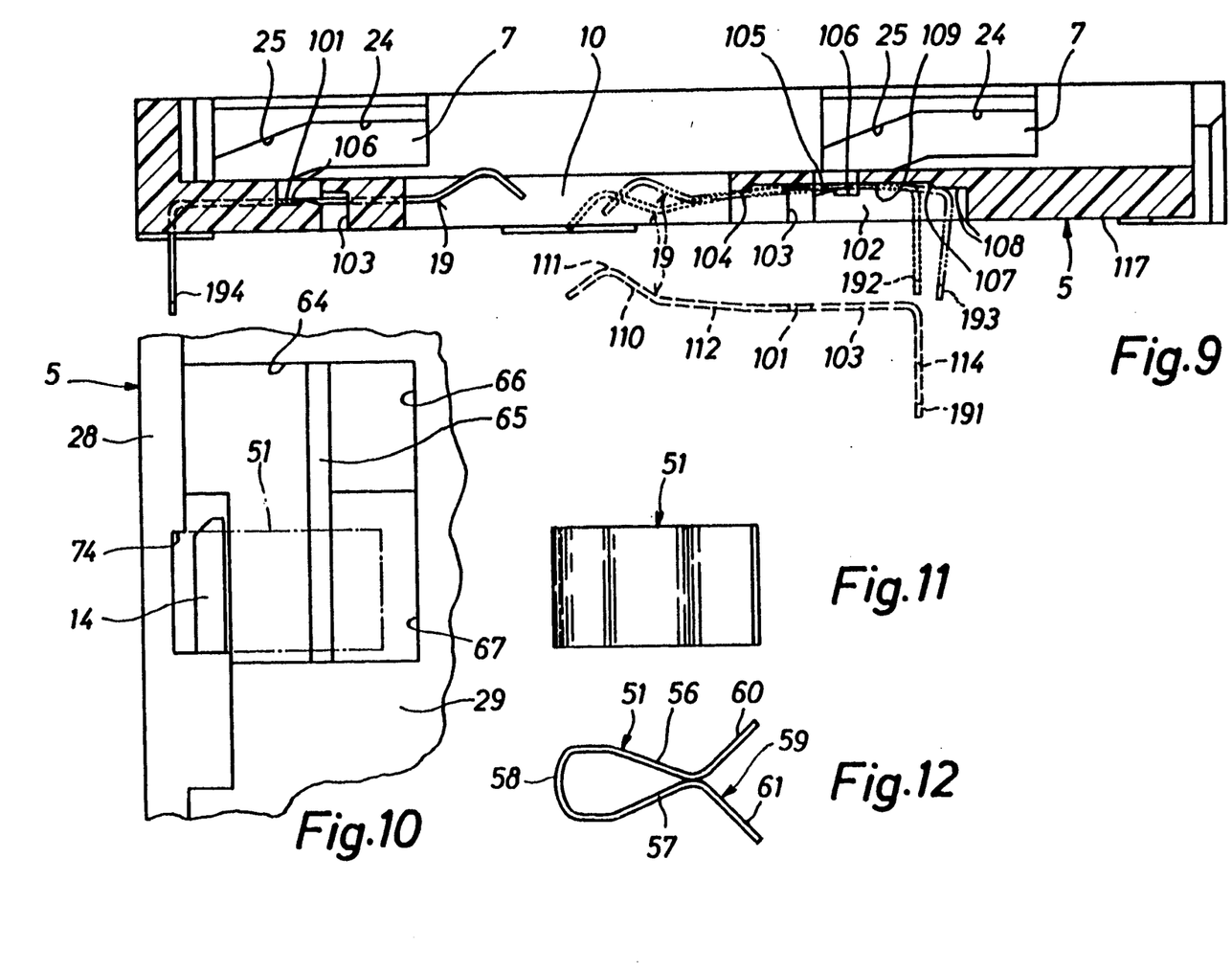
FIG. 9 is a sectional view parallel to the longitudinal axis of the contact support in the area of the reading contacts with the shape of the reading contacts as well as the insertion of the reading contacts in a biased manner being shown.
FIG. 10 is a detail of FIG. 4 in the area of the mounting means for the card brake.
FIG. 11 is a plan view of a metal clamp forming the card brake.
FIG. 12 is a sectional view of the metal clamp of FIG. 11.

In FIGS. 5-8 as well as FIGS. 10 -12 the card brake 51 of the invention in the form of a brake spring is specifically shown in the form of a metal clamp. FIG. 1 discloses a plan view of the brake spring 52 and FIG. 12 shows that the brake spring 12 formed by a metal clamp comprises a first leg 56, a second leg 57 and a connecting portion 58 connecting said two legs. The opening formed by the legs 56 and 57 as well as the connecting portion 58 is formed such that the spring 51 can be placed on the pin 14 such, that the spring can pivot about the pin 14 as it is shown in FIGS. 5 to 8. The spring is rotatably mounted in a limited degree without any play. The braking spring 51 is—as it is shown in FIG. 12—in its rest position pressed together by means of its two legs 56, 57 but forms a mouth 59 comprising a first mouth part 60 and a second mouth part 61. The mouth 59 is, as it is shown, opened up in the rest position of the spring 51 so as to provide for a catching area for catching the chip card 2 when it is inserted.

With regard to the arrangment of the brake spring 51 at the contact support 5 attention is drawn to FIG. 10 which shows that in the bottom wall 29 adjacent to the back wall 28 a recess 64 is provided with respect to the surface 85. Said recess 64 is bordered by a web 65, see FIG. 10. At the upper right side of said web 65 a recess 66 is provided on the same level as the recess 64, while adjacent thereto (downwardly) in the area where the brake spring 51 is to be inserted a hole 67 is provided which provides space for the second mouth portion 61 when the spring 51 is inserted.

Commonly, the brake spring 51 is slid from above onto the pin 14 and sits with the connection portion 58 in a recess 74 (FIG. 10) of the back wall 28 so that a limited rotary movement can be carried out but no movement can occur perpendicularly with respect to longitudinal axis 55 or in a direction of the longitudinal axis 55.

FIG. 5 through FIG. 8 and FIG. 9 disclose the design of the reading contacts 19 and the switching contacts 20, 21. FIG. 9 discloses on the left side a reading contact 19 in its finished mounted position. The finished mounted reading contact 19 is biased so that for the small available spring path the required contacting force is applied between the reading contact and the contact zones of the card as it is shown in FIG. 4 at 90. Due to the flat spring characteristic the thickness tolerance of the card 2 does not influence the contact force in an unadmissable manner. In the right bottom part of FIG. 9 a reading contact 19 of the invention is shown in its form prior to being installed. This not installed position is referred to by reference numeral 191, and the next step is referred to by 192, again the next step is referred to by 193, and the installed position is referred to by 194.

Each reading contact 19 comprises a cusp portion 110 having a contact cusp 111 at the free end of the contact spring 19. Adjacent thereto is a first straight portion 112 as well as a second straight portion 113 which continues in a termination part 14 angled by 90°. The two straight parts 112, 113 form an angle of somewhat less than 180° with the consequence that then, when said contact 19 is, as it is shown in FIG. 9, installed the two straight portions 112, 113 are located on one line so that a bias results for the contact 19. At the location where the first straight portion 112 connects to the second straight portion 113 opposite webs 101 are provided at the contact element 19 when stamping the contact element 19. The one web extends into the plane of drawing and the other web extends out of the plane of drawing. Said webs 101 serve for locking said contact elements at the contact support 5.

So as to allow for the mounting and the locking (by detent means) of the reading contacts 19 at the contact support 5 the slots 10 adapted to receive the contact springs, are formed in the manner now described. Each receiving slot 10 forms a chamber 102 of insertion. Said insertion chamber 102 has a width transversally with respect to the longitudinal axis which corresponds approximately to the width of the reading contact 19. So as to be able to insert the webs 101 projecting towards both sides a slot extension 103 is provided. The position 192 of the reading contact 19 shows the condition immediately after insertion of the reading contact into the chamber 102 where the reading contact 19 already is in engagement with an abutment web 4 as well as with the chamber bottom 109. Thereupon the reading contact 19 is moved in FIG. 9 rightwardly into the position referred to by reference numeral 193 and during said operation said reading contact slides on a ramp 105 upwardly so as to fall eventually—as it is shown in the left handside of FIG. 9—into a locking or detent seat formed by a recess. During said movement the right end of the straight portion 113 moves across a ramp surface 107 onto a seat surface 108 such that the contact is biased in the position referred to by reference numeral 194.

Figure 13:
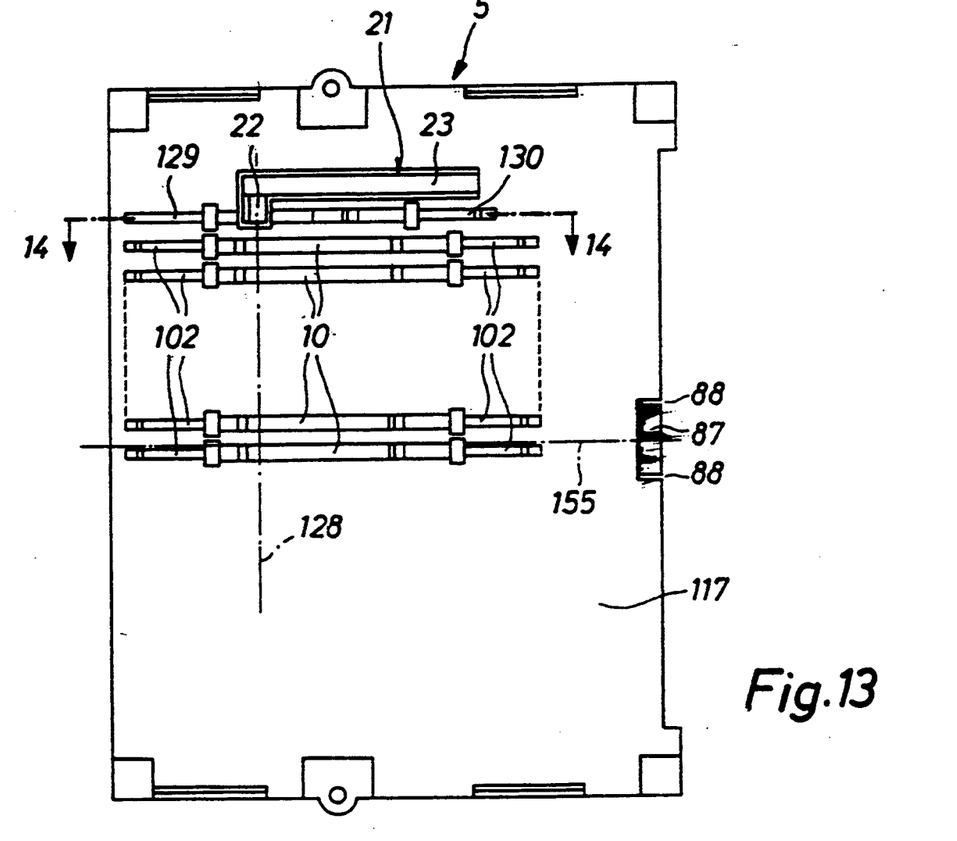
FIG. 13 is a schematic partial view of the contact support as seen from below in the area of the switching arm for the switching contacts.
Figure 14:
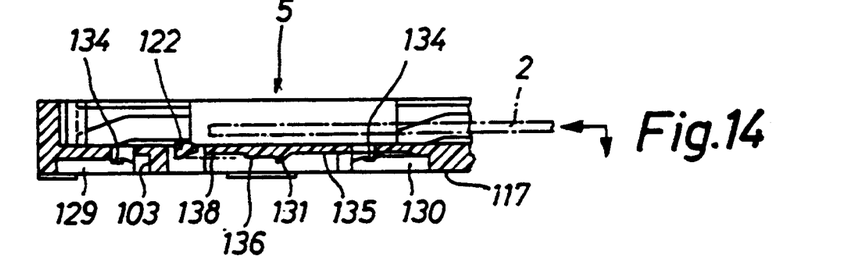
FIG. 14 is a sectional view along line 14—14 in FIG. 13 with the switching contact not being inserted.
Figure 15:
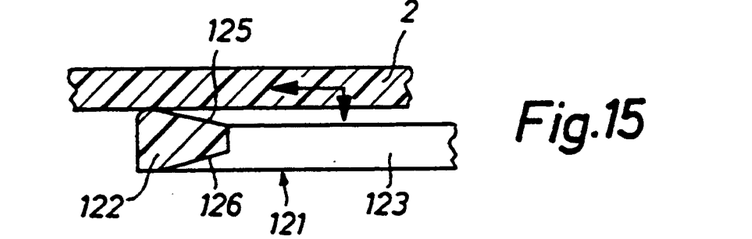
FIG. 15 is an enlarged representation of the free end of the switching arm forming a switching cam.

Referring to FIGS. 5 to 8 as well as FIGS. 13 to 15 the end position switch 120 of the invention is explained. The end position switch 120 comprises in the embodiment shown a first switch contact 20 and a second switch contact 121 as well as a switch actuating element in the form of a switch arm 121.

The end position switch 120 supplies when closed, information about the fact that the card receiving means 4 is in its reading position, i.e. its end position within which it is held by means of the card brake 51. Even though this is not shown information with respect to the end position can also be supplied by opening switching contacts which are normally closed.

The switching contacts 20 and 21 can be best seen in FIGS. 5 through 8. Said switching contacts have the same design and they are also designed similar to the switching contacts 19 with the exception that no cusp portion 110 is present but that the straight portion 112 is also provided in the area of the cusp portion. All switching contacts 20, 21 are biased when located in their installed position in a direction away from the bottom side 117 of the contact support (see FIG. 5).

At both sides of a line 128 extending perpendicular with respect to the center line insertion chambers 129 and 130 are provided at the bottom side 117 of the contact support 5. The insertion chamber 129 is in substance similar to the insertion chamber 102 for a reading contact. The insertion chamber 130 is disclosed in detail in FIGS. 5 through 8 and in FIG. 14. The insertion chamber 130 comprises a broadening 103 of the slot for the passage of the webs of the switching contact. Moreover, at the bottom of the slot a recess 138 is formed serving as a support for the free end of the switching contact 20 placed in the chamber 129. A support surface 36 is located on a somewhat higher elevation than the support surface formed by the recess 138 with an adjacent nose 131 which eventually merges via a ramp surface with the chamber bottom 135. A locking or detent recess 135 is adapted to receive the two webs of the switching contact 21. The switching contact 21 is also located in a biased manner in the end position shown in FIG. 5. FIG. 5 through 8 disclose further that the switching contact 20 is located with its free end upwardly with respect to the free end of the switching contact 21 (see FIG. 5) so as to be transported into the closing position shown in FIG. 8 by means of a switching cam 22 formed at a switching arm 21.

The switching arm 21 and the end position switch 120 are now described in some detail. The switching arm 21 is of single a piece design and is formed preferably by injection molding together with the contact support 5 and comprises a relativley long lever arm 23 at the free end of which a switching cam 22 is formed. The arrangement and the design of the switching arm 121 is shown in FIGS. 4, 5 through 8 as well as FIGS. 13 and 15. The switching cam 122 forms a card actuating surface 125 as well as—with an angle thereto—a contact engagement surface 126. The cam 122 is generally wedge shaped.

Figure 5:
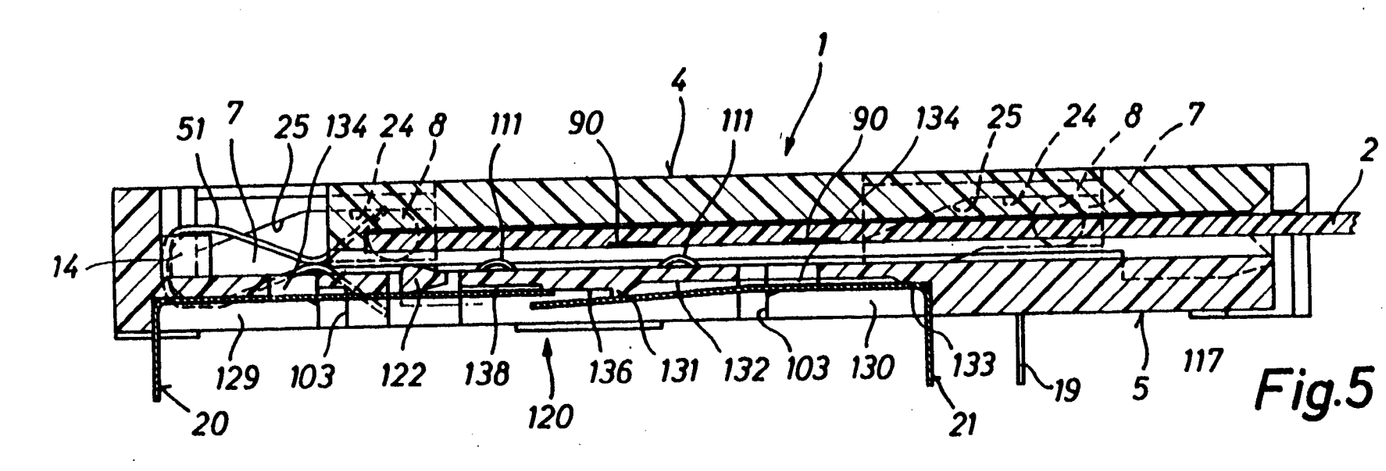
FIG. 5 is a schematic sectional view of the chip card reader in its insertion and ejection position.

Now the operation of the chip card reader of the invention will be descibed. When the chip card reader is not used or is in its rest position the card receiving means 4 is urged—as it is shown in FIGS. 4 and 5—by means of the spring 12 against the abutment surfaces 42 and 43. The spring 12 is—in the position shown in of FIG. 4—biased and transmits its force onto the card receiving means 4 via transport element 40 formed at said card receiving means 4. Said transport element 40 are each designed in the form of slots which are adapted to receive the free ends of the spring 12. In case the chip card 2 is inserted from the right into the slot shaped guide path 35 and 36 formed by the card receiving means 4 and shown in FIG. 2, then said card slides along said guide path until the card eventually abuts with its abutment edge 44 at the abutment edge 38 of the card receiving means. The continued application of a force of insertion (push) onto the card 2 will move the card together 4 with said card receiving means 4 downwardly in accordance with what is shown in FIGS. 5 through 8. As it is shown in FIGS. 4 and 5 the brake spring 51 is arranged such that the card will already reach the catching area of said brake spring 51 when the card comes into engagement with the abutment edge 38 of said card receiving means 4. For continued movement the card 2 presses the two legs of the spring 51 apart so that said legs exert a clamping or holding force onto said card. Initially, said force is overcome due to the continued movement of insertion. After the card 2 has reached the position shown in FIG. 8 the card 2 will be maintained in the reading position only by said spring 51 together with the card receiving means providing guidance for the card 2; said card receiving means is still under the effect of the force of the spring 12 which, however, due to the braking force of the spring 51 cannot effect a movement of the card and of the card receiving means 4 out of the reading position.

The downward movement of the card receiving means 4 together with the card 2 shown in FIG. 5 through 8 is effected by said guide means 7, 8 and in particular by the inclined slot portion 24 forming the downward cam curve or path. It should be noted that in accordance with the invention, the reading position in accordance with FIG. 8 will be reached in the area of the inclined slot portion 25, i.e. the inclined slot portion does not extend in the insert direction of the card 2 as a horizontal slot portion.

It can be recognized in FIG. 5 7 that in the course of the insert and downward movement of the card 2 and the card receiving means 4 the starting area of the contact zones 90 comes into engagement with the contact cusps 111 of the card contacts 19 and that the final contact engagement in accordance with FIG. 8, which will also cause the closing of the end position switch 129, occurs well within the area of tolerance of said contact zones 90.

Figure 6:
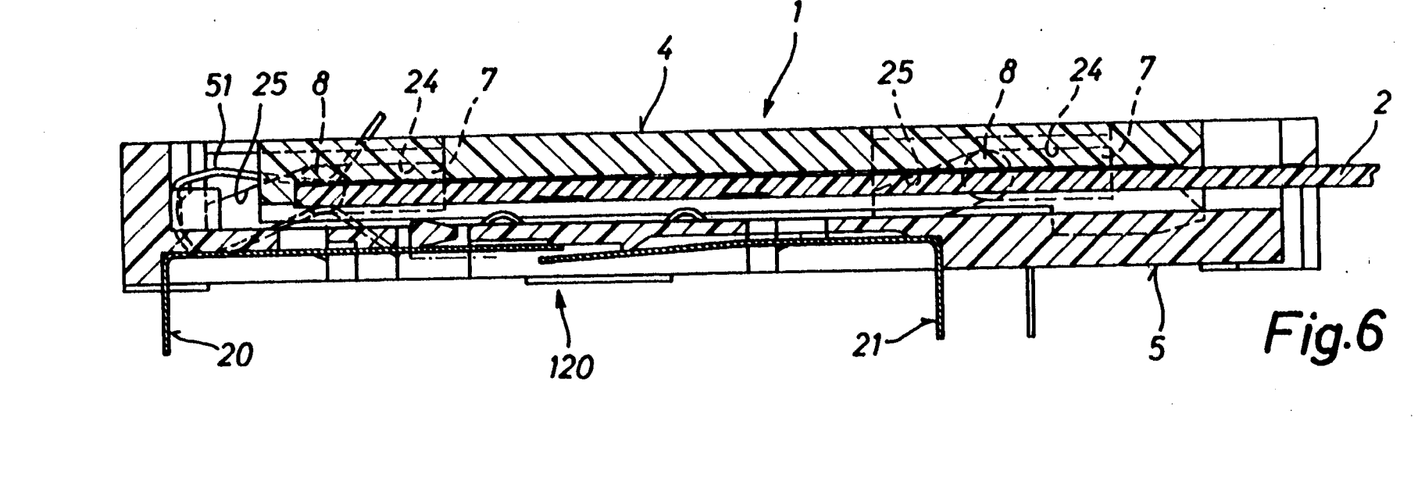
FIG. 6 is a view similar to FIG. 5 showing the card receiving means already moved in the direction of the reading position just starting with the downward movement.

When evaluating FIGS. 5 through 8 further it is recognized that the brake spring 51 can initially carry out a limited rotary movement (FIG. 6) upwardly and then slowly via the position of FIG. 6 back to the initial position shown in FIG. 8.

With regard to the actuation of the end position switch attention is drawn to FIG. 5 through 8 and FIG. 14 and 15 where it is shown how the card 2 moves against the card actuating surface 25 and pivots the switching cam (as it is shown in FIG. 8) so far that the two switching contacts 20 and 21 contact each other.

The chip card reader 1 of the invention operates according to the so-called push-pull-principle. FIG. 8 discloses the reading position of the card after finishing the push operation. From said reading position of FIG. 8 the card will be removed by the pull operation. The operator pulls at the end of the card which projects into the right direction whereby the braking force of the brake spring 51 is overcome. For a continued pulling force applied to the card, said card eventually is freed from the clamping force between the two legs and returns together with the card receiving means 4 (due to the effect of the spring 12) into its rest position 16, where the card 2 is adapted to be easily removable from said card receiving means 4.

Summarizing it may be said that the invention provides a chip card reader 1 which has a contact set having a plurality of contact elements. The set of contact elements (contact set) is preferably connected mechanically and electrically to a circuit board. The contact set is supported by a contact support means 5 within which said card receiving means 4 is movably mounted in longitudinal direction as well as in an elevational direction. Said card receiving means comprises elements adapted to receive and guide the chip card; said elements form a card slot. Preferably, four pins are provided to guide the card receiving means 4 in slots or grooves preferably inclined grooves of the contact support 5. When said chip card is inserted into said card receiving means 4, said card receiving means is moved together with the chip card and moves preferably under angle of about 20° with respect to said contact support 5. Said reading contacts 19 come into engagement with contact zones 90 formed by the contact region of the card 2 and slide from there until the end abutment is reached within the respective contact zones 90 of the contact region. The set of contact elements contains besides said reading contacts 19 two switching contacts 20, 21 which form the end position switch. One of said contact elements is actuated by the resilient switching arm formed together with said contact support 4. The displacement of the switching arm 121 occurs by means of said card 2 after the reading contacts 19 have closed. The brake integrated into the contact support 5 hold the card together with said card receiving means 4 in the reading position against the force exerted by the return spring 12.

The downward movement of the card towards and against the reading contacts due to the insertion of the card, is achieved by said card receiving means which is movably mounted in said contact support in the direction of insertion and against said contact support. Said return spring for the card receiving means 4 is preferably a straight spring wire 12 which extends between the contact support and said card receiving means.

The card brake of the invention is neutralized in forces and does not influence the switching or reading contacts, or the switching sequence.

We claim:

1. A chip card reader comprising a contact support having contact elements and a card receiving means
   wherein the contact elements are stationarily mounted in said contact support and said card receiving means is reciprocally mounted in said contact support such that when said chip card is inserted into said card receiving means, said card receiving means is moved together with the chip card towards the contact elements provided in said contact support, and
   further comprising a card brake which comes directly into engagement with said card and holds the card in the reading position, said card brake being pivotably mounted such that the brake can follow the downward movement of the chip card so as to avoid having the chip card pushed out of its position with respect to said contact elements.

2. The chip card reader according to claim 1, wherein the card which is being moved towards the stationary contacts in said contact support reaches is reading position while said card together with said card receiving means is still located on an inclined path leading towards said contact elements.

3. The chip card reader according to claim 1, wherein said card brake is designed such that it does not decrease or balance the contact forces of said contact elements.

4. The chip card reader according to claim 1, wherein the card brake is in a limited manner rotatably mounted about an axis perpendicular to the center axis of the reader and parallel to the plane of the card, and that the mounting of the brake is such that it is largely free of play in the direction of push and pull of the card.

5. The chip card reader according to claim 1, wherein the range of pivotal movement of said card brake in upward and downward direction is limited by means such that the card can always safely enter said brake.

6. The chip card reader according to claim 1, wherein the contact support comprises guide means and the card receiving means with an adjacent inclined guide member leading towards the contact elements.

7. The chip card reader according to claim 6, wherein said inclined guide member extends with respect to the horizontal guide member by an angle of 20°.

8. The chip card reader according to claim 1, wherein the contact support is provided with guide slots is provided with guide pins, or visa versa, said elements being brought in engagement with each other by snapping action.

9. The chip card reader according to claim 1, further comprising an end position switch which is actuated by the downward movement of the card and not the longitudinal movement of the card when the card reaches the reading position.

10. The chip card reader according to claim 9, wherein the end position switch comprises two similar switching contact springs which are mounted in a similar manner to the reading contacts.

11. The chip card reader according to claim 10, wherein the switching contacts do not act in the direction of the insertion or the removal of the card but in a direction supporting the brake action onto the card.

12. The chip card reader according to claim 10, wherein the switching contacts and the reading contacts are each arranged in said contact support with bias.

13. The chip card reader according to claim 1, wherein the contact elements are inserted into the contact support from the bottom side and are located therein by detent or locking means, such that during the insertion and the locking or detent operation the biasing of the contacts is created.

14. The chip card reader according to claim 1, further comprising a return spring which is in its normal position a straight wire.

15. The chip card reader according to claim 1, wherein the card brake is rotatably mounted at said contact support in a limited manner, is further free of play and aligns itself during the downward movement of the card so as to provide a suitable angle of insertion for the card brake and that the chip card will reach independently of the position of installment of the reader, the catching range of the card brake so that the card brake is neutral with respect to the existing forces.

* * * * *

UNITED STATES PATENT AND TRADEMARK OFFICE
CERTIFICATE OF CORRECTION

PATENT NO. : 5,369,259

DATED : November 29, 1994

INVENTOR(S) : BLEIER et al.

It is certified that error appears in the above-identified patent and that said Letters Patent is hereby corrected as shown below:

ON THE COVER PAGE

Item [73] Assignee: should read

--Amphenol-Tuchel Electronics GmbH, Heilbronn, Germany--.

Signed and Sealed this

Eighth Day of August, 1995

Attest:

BRUCE LEHMAN

*Attesting Officer*     *Commissioner of Patents and Trademarks*